US012689995B2

(12) United States Patent (10) Patent No.: US 12,689,995 B2
Hirata et al. (45) Date of Patent: Jul. 21, 2026

(54) WIRELESS COMMUNICATION DEVICE, WIRELESS COMMUNICATION TERMINAL, AND WIRELESS COMMUNICATION METHOD

(71) Applicant: Sony Group Corporation, Tokyo (JP)

(72) Inventors: Ryuichi Hirata, Tokyo (JP); Yusuke Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 296 days.

(21) Appl. No.: 18/563,385

(22) PCT Filed: Feb. 7, 2022

(86) PCT No.: PCT/JP2022/004584
§ 371 (c)(1),
(2) Date: Nov. 22, 2023

(87) PCT Pub. No.: WO2022/254791
PCT Pub. Date: Dec. 8, 2022

(65) Prior Publication Data
US 2024/0276405 A1 Aug. 15, 2024

(30) Foreign Application Priority Data
Jun. 1, 2021 (JP) ................................. 2021-092264

(51) Int. Cl.
*H04W 56/00* (2009.01)
(52) U.S. Cl.
CPC ............................... *H04W 56/0005* (2013.01)

(58) Field of Classification Search
CPC ......... H04W 56/0005; H04W 28/0247; H04W 28/0278; H04W 28/0861; H04W 76/11; H04W 76/15; Y02D 30/70
See application file for complete search history.

(56) References Cited

U.S. PATENT DOCUMENTS

| 11,838,788 | B2 * | 12/2023 | Kwon | ............... | H04W 28/0268 |
| 12,284,616 | B2 * | 4/2025 | Gan | ................ | H04W 56/0005 |
| 2021/0076413 | A1 * | 3/2021 | Lu | ......................... | H04W 76/15 |
| 2021/0112543 | A1 * | 4/2021 | Das | ..................... | H04B 17/318 |

(Continued)

FOREIGN PATENT DOCUMENTS

| EP | 3790346 A1 | 3/2021 |
| EP | 4187988 A1 | 5/2023 |

(Continued)

OTHER PUBLICATIONS

CN_120602994_A (Year: 2025).*

(Continued)

*Primary Examiner* — Nizar N Sivji
(74) *Attorney, Agent, or Firm* — XSENSUS LLP

(57) ABSTRACT
A wireless communication device and corresponding method that performs communication with a wireless communication terminal over a plurality of links, and causes a first Downlink frame to be transmitted in a first link, the first Downlink frame including information regarding transmission of an uplink frame in the first link and second information regarding transmission of at least a part of an uplink frame in a second link.

19 Claims, 11 Drawing Sheets

(56) References Cited

U.S. PATENT DOCUMENTS

| | | | |
|---|---|---|---|
| 2021/0144766 A1* | 5/2021 | Kim | H04L 5/14 |
| 2022/0225406 A1* | 7/2022 | Kim | H04L 1/1621 |
| 2022/0303997 A1* | 9/2022 | Aio | H04W 72/541 |
| 2023/0137441 A1* | 5/2023 | Yoshikawa | H04L 5/0094 |
| | | | 370/329 |
| 2024/0106585 A1* | 3/2024 | Lou | H04L 5/0023 |
| 2024/0172284 A1* | 5/2024 | Tanaka | H04W 74/0816 |
| 2024/0323653 A1* | 9/2024 | Wang | H04W 4/06 |
| 2025/0048174 A1* | 2/2025 | Sun | H04W 28/0278 |

FOREIGN PATENT DOCUMENTS

| | | | |
|---|---|---|---|
| EP | 4193793 A1 | 6/2023 |
| EP | 4229917 A1 | 8/2023 |
| EP | 4252461 A1 | 10/2023 |
| EP | 4319406 A1 | 2/2024 |
| GB | 2606593 A | 11/2022 |
| JP | 2020124643 | 7/2020 |
| JP | 2022021186 A | 2/2022 |
| WO | WO-2020226462 A1 | 11/2020 |
| WO | 2021/090718 A1 | 5/2021 |
| WO | 2022/018984 A1 | 1/2022 |

OTHER PUBLICATIONS

International Search Report and Written Opinion mailed on May 17, 2022, received for PCT Application PCT/JP2022/004584, filed on Feb. 7, 2022, 8 pages including English Translation.

Park et al., "Multi-Link Power Save—Link Bitmap", IEEE 802.11-20/0085r1, Jan. 2020, pp. 1-10.

Seok et al., "Multi-link Triggered Uplink Access Follow Up", doc.: IEEE 802.11 20/0671r3, Jul. 2020, pp. 1-15.

Young Hoon Kwon et al., MAC MLO Enhanced Multi-link Operation Mode, IEEE 802.11-20/1440r4, Sep. 2020.

\* cited by examiner

*FIG. 1*

Background Art

WIRELESS COMMUNICATION DEVICE, WIRELESS COMMUNICATION TERMINAL, AND WIRELESS COMMUNICATION METHOD

CROSS-REFERENCE TO RELATED APPLICATIONS

The present application is based on PCT filing PCT/JP2022/004584, filed Feb. 7, 2022, which claims priority from Japanese Patent Application No. 2021-092264, filed Jun. 1, 2021, the entire contents of each are incorporated herein by reference.

TECHNICAL FIELD

The present technology relates to a wireless communication device, a wireless communication terminal, and a wireless communication method, and more particularly to a wireless communication device, a wireless communication terminal, and a wireless communication method capable of performing up link (UL) multi user (MU) communication with the desired number of terminals.

BACKGROUND ART

Wireless communication using a plurality of links (multi-link operation (MLO)) has been studied as a method for coping with the requirement of high transmission speed such as 8K transmission or xReality (xR). The "link" is a wireless transmission path through which data can be transmitted between two wireless communication devices.

When MLO is performed, individual links are selected from, for example, a plurality of wireless transmission paths divided in a frequency domain and independent from each other.

A device corresponding to MLO is referred to as a multi-link device (MLD). MLD is a logical entity including two or more STAs, and has only one service access point (SAP) to an upper layer. MLD in which each included STA is AP is referred to as AP MLD, and MLD in which each included STA is non-AP is referred to as non-AP MLD.

MLD performs transmission by using a plurality of links. However, in MLD, due to factors such as a degree of proximity of frequencies between links, a transmitted signal in a certain link may be leaked, and interference with a received signal in another link may be intense, resulting in deterioration of communication quality.

As described above, a pair of links, in which a restriction occurs when transmission and reception are performed simultaneously between links, is referred to as nonsimultaneous transmit and receive (NSTR) link pair. On the other hand, a pair of links with no restriction when signals are simultaneously transmitted and received between links, such as a case where leakage power between links does not affect communication quality, is referred to as simultaneous transmit and receive (STR) link pair.

Hereinafter, in a case where AP MLD and non-AP MLD communicate with each other using certain link pair, when the link pair is STR link pair for AP MLD and is NSTR link pair for non-AP MLD, AP MLD is defined as STR AP MLD, and non-AP MLD is defined as non-STR non-AP MLD.

Non-Patent Document 1 describes an arrangement about a Trigger frame transmitted by AP MLD to non-STR non-AP MLD over a plurality of links to induce up link (UL)

physical. layer (PHY) protocol data unit (PPDU), which is a medium access control (MAC) frame in a downlink PPDU format.

CITATION LIST

Non-Patent Documents

Non-Patent Document 1: Yongho Seok, James Yee, Jianhan Liu, Thomas Pare, "Multi-link Triggered Uplink Access Follow Up", IEEE 802.11-20/0671r3, searched on Jul. 29, 2020, Internet <https://mentor.ieee.org/802.11/dcn/20/11-20-0671-03-00be-multi-link-triggered-uplink-access-follow-up.pptx searched on May 1, 2021>

SUMMARY OF THE INVENTION

Problems to be Solved by the Invention

According to the arrangement described in Non-Patent Document 1, when AP MLD transmits a Trigger frame to non-STR non-AP MLD over a plurality of links to induce transmission of up link (UL) PPDU that is an uplink frame, it is necessary to align transmission end times of the Trigger frame.

However, in a case where a transmission start time of the Trigger frame is shifted between the links, a transmittable time of the Trigger frame to be transmitted later is restricted, and there is a possibility that it is difficult to perform multiplexing for the desired number of terminals.

The present technology has been achieved in view of such circumstances, and makes it possible to perform UL MU communication with the desired number of terminals.

Solutions to Problems

A wireless communication device according to a first aspect of the present technology includes: a communication unit that communicates with a wireless communication terminal over a plurality of links; and a communication control unit that causes a first Trigger frame to be transmitted in a first link, the first Trigger frame including first information regarding transmission of a frame in the first link and second information regarding transmission of at least a part of a frame in a second link.

A wireless communication terminal according to a second aspect of the present technology includes: a communication unit that performs communication with a wireless communication device over a plurality of links, and receives a first Trigger frame including first information regarding transmission of a frame in a first link and second information regarding transmission of at least a part of a frame in a second link and a second Trigger frame including third information regarding transmission of a frame in the second link; and a communication control unit that causes a frame to be transmitted in the second link on the basis of the second information and the third information.

In the first aspect of the present technology, communication is performed with a wireless communication terminal over a plurality of links. Then, a first Trigger frame including first information regarding transmission of a frame in a first link and second information regarding transmission of at least a part of a frame in a second link is transmitted in the first link.

In the second aspect of the present technology, communication is performed with a wireless communication device over a plurality of links, and a first Trigger frame including first information regarding transmission of a frame in a first link and second information regarding transmission of at least a part of a frame in a second link and a second Trigger frame including third information regarding transmission of a frame in the second link are received. Then, a frame is transmitted in the second link on the basis of the second information and the third information.

BRIEF DESCRIPTION OF DRAWINGS

FIG. 1 is a diagram illustrating a configuration example of a wireless communication system according to embodiments of the present technology.

FIG. 10 is a block diagram illustrating a configuration example of a part of a communication unit in FIG. 8.

FIG. 11 is a block diagram illustrating a configuration example of a computer.

MODE FOR CARRYING OUT THE INVENTION

Figure 2:
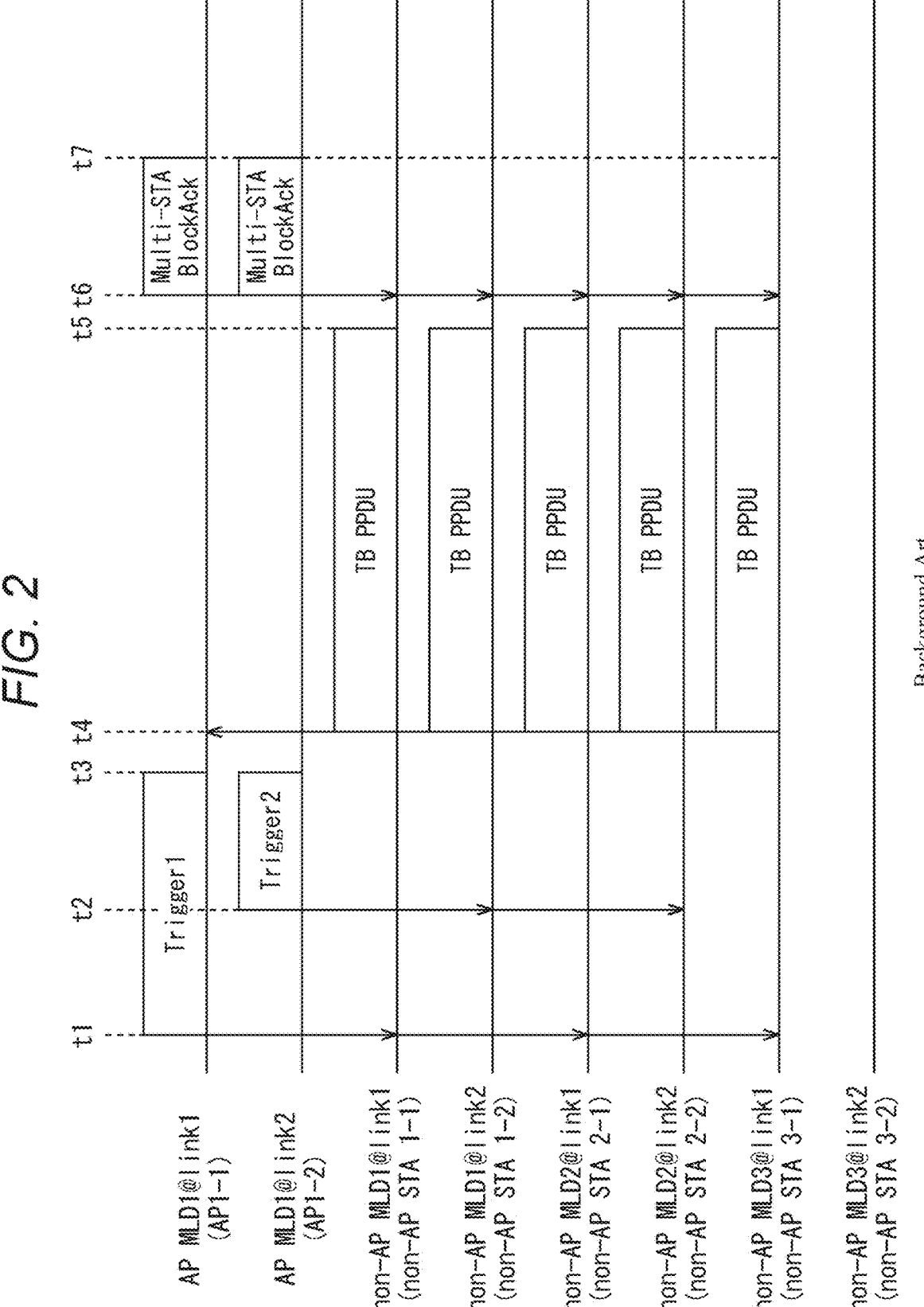
FIG. 2 is a diagram illustrating an example of a conventional sequence.

Hereinafter, modes for carrying out the present technology will be described. The description will be made in the following order.

1. System Configuration
2. Prior Art
3. First Embodiment
4. Second Embodiment
5. Others

1. System Configuration

<Configuration Example of Wireless Communication System>

Figure 1:
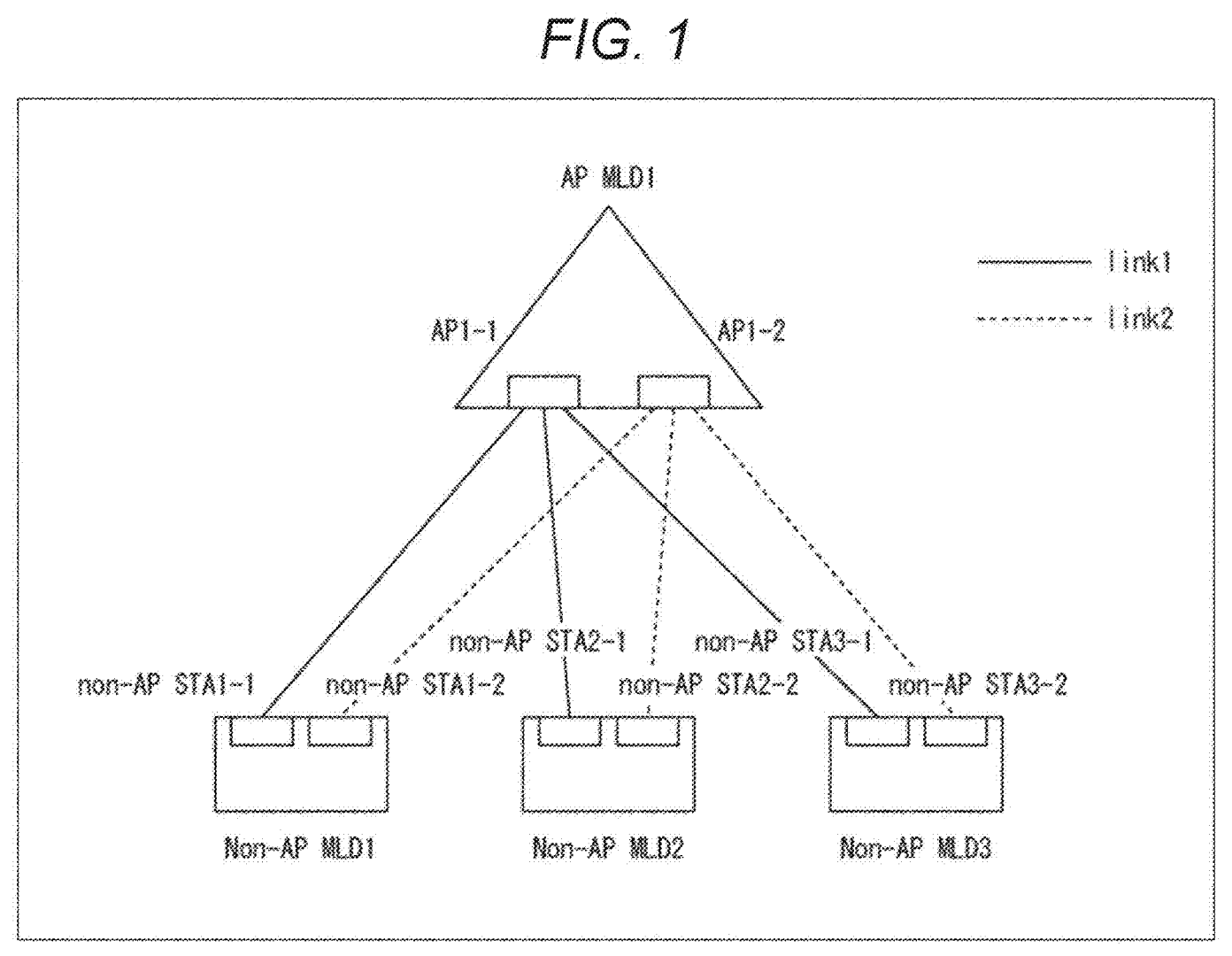

FIG. 1 is a diagram illustrating a configuration example of a wireless communication system according to embodiments of the present technology.

In the wireless communication system of FIG. 1, data is transmitted and received by wireless communication using a plurality of links (MLO).

When MLO is performed, individual links are selected from, for example, a plurality of wireless transmission paths divided in a frequency domain and independent from each other. For example, channels selected from a plurality of channels included in any band of frequency bands such as 2.4 GHz band, 5 GHZ band, 6 GHz band, and 920 MHz band are used by the individual links.

A device corresponding to MLO is referred to as MLD as described above. MLD is a logical entity including two or more STAs, and has only one SAP to an upper layer.

The wireless communication system in FIG. 1 includes one AP MLD1 and three non-AP MLD1 to non-AP MLD3. Non-AP MLD1 to non-AP MLD3 are connected to AP MLD1.

In FIG. 1, a solid line connecting AP MLD1 and non-AP MLD1 to non-AP MLD3 represents link1 (first link), and a broken line connecting AP MLD1 and non-AP MLD1 to non-AP MLD3 represents link2 (second link).

AP MLD1 is a wireless communication device that operates as a base station corresponding to MLO. AP MLD1 includes AP1-1 and AP1-2. AP1-1 is a logical entity that operates using link1. AP1-2 is a logical entity that operates using link2.

Non-AP MLD1 to non-AP MLD3 are wireless communication devices that operate as terminals corresponding to MLO. Non-AP MLD1 includes non-AP STA1-1 and non-AP STA1-2. Non-AP STA1-1 is a logical entity that operates using link1. Non-AP STA1-2 is a logical entity that operates using link2.

Non-AP MLD2 includes non-AP STA2-1 and non-AP STA2-2. Non-AP STA2-1 is a logical entity that operates using link1. Non-AP STA2-2 is a logical entity that operates using link2. Non-AP MLD3 includes non-AP STA3-1 and non-AP STA3-2. Non-AP STA3-1 is a logical entity that operates using link1. Non-AP STA3-2 is a logical entity that operates using link2.

In FIG. 1, AP1 communicates with non-AP STA1-1 to non-AP STA3-1 using link1. AP2 communicates with non-AP STA1-2 to non-AP STA3-2 using link2.

Link1 and link2 may be two channels selected from the same frequency band or two channels selected from different frequency bands.

Furthermore, the number of links used between AP MLD1 and non-AP MLD1 to non-AP MLD3 is not limited to two, and three or more links may be used for communication. Furthermore, the number of non-AP MLDs is not limited to three, and four or more non-AP MLDs may be connected to AP MLD1.

2. Prior Art

As described above, MLD performs transmission by using a plurality of links. However, in MLD, due to factors such as a degree of proximity of frequencies between links, a transmitted signal in a certain link may be leaked, and interference with a received signal in another link may be intense, resulting in deterioration of communication quality.

Thus, a pair of links in which a restriction occurs when transmission and reception are performed simultaneously between links is referred to as NSTR link pair as described above. On the other hand, a pair of links with no restriction when signals are simultaneously transmitted and received between links, such as a case where leakage power between links does not affect communication quality, is referred to as STR link pair as described above.

Note that, as described above, in a case where AP MLD and non-AP MLD communicate with each other using certain link pair, when the link pair is STR link pair for AP MLD and is NSTR link pair for non-AP MLD, AP MLD is defined as STR AP MLD, and non-AP MLD is defined as non-STR non-AP MLD. Therefore, in the following specification, even if STR or non-STR is not particularly described, AP MLD is STR AP MLD, and non-AP MLD is non-STR non-AP MLD.

Furthermore, for example, when AP MLD and non-AP MLD communicate using three links (link1, 2, 3), a combination of links is assumed in which link1 and link2 are NSTR link pair and link1 and link3 and link2 and link3 are STR link pairs. In this case, the operations described in this specification are applied to operations in link1 and link2. Moreover, it is also assumed that link1 and link3 that have been STR link pairs can be dynamically changed to NSTR link pairs by changing transmission power, a transmission band, and the like. In this case, the operations described in this specification are applied to operations in link1 and link3.

Here, as described above, Non-Patent Document 1 describes an arrangement about Trigger transmitted when AP MLD transmits DL PPDU to non-STR non-AP MLD over a plurality of links.

That is, when AP MLD transmits DL PPDU to non-STR non-AP MLD over the plurality of links, in a case where DL PPDU is PPDU that requests immediate response from non-STR non-AP MLD after a short inter frame space (SIFS) from the end of transmission, AP MLD sets a difference in transmission end time of DL PPDU between the links to a difference of 8 us or less, and transmits DL PPDU.

Furthermore, in a case where DL PPDU described above is a Trigger frame at the time of transmission of DL PPDU, when CS Required subfield in a Trigger frame is set to 1 and carrier sensing is requested before transmission of PPDU induced by the Trigger frame, AP MLD sets the difference in the transmission end time of DL PPDU between the links to a difference of 4 us or less, and transmits DL PPDU.

With this arrangement, in non-STR non-AP MLD, simultaneous occurrence of reception of DL PPDU and transmission of immediate response after SIFS in which DL PPDU has been received can be suppressed.

However, when AP MLD transmits the Trigger frame to non-STR non-AP MLD over the plurality of links to induce transmission of PPDU, it is necessary to align transmission end times of the Trigger frame.

<Example of Conventional Sequence>

FIG. 2 is a diagram illustrating a sequence when AP MLD1 induces UL MU communication in Trigger frames in link1 and link2 with respect to non-AP MLD1 to non-AP MLD3 as non-STR.

FIG. 2 illustrates an example in which non-AP MLD1 to non-AP MLD3, which are non-STR non-AP MLDs, are connected to AP MLD1 and communicate using link1 and link2.

In such a case, as indicated at time t1 and time t2, AP MLD needs to transmit Trigger (Trigger1, Trigger2) frames in both link1 and link2.

As illustrated in FIG. 2, AP MLD1 acquires a transmission right of link1 and transmits the Trigger1 frame to non-AP MLD1 to non-AP MLD3 at time t1, and acquires a transmission right of link2 and transmits the Trigger2 frame to non-AP MLD1 and non-AP MLD2 at time t2.

Then, AP MLD1 simultaneously ends the transmission of the Trigger1 frame and the Trigger2 frame at time t3.

That is, since AP MLD1 tries to acquire the transmission rights of link1 and link2 independently, transmission start times of the Trigger1 frame and the Trigger2 frame may deviate from each other. For example, in a case where a network allocation vector (NAV) is set during transmission by another terminal in link2, or in a case where there is a difference between backoff counters set in link1 and link2, the transmission start time of the Trigger2 frame may be delayed more than the transmission of the Trigger1 frame.

On the other hand, as described above, transmission end times of the Trigger1 frame and the Trigger2 frame need to be aligned. Therefore, in a case where the transmission of the Trigger2 frame in link2 is delayed from the transmission of the Trigger1 frame in link1 as at time t3, there is a restriction on a transmittable time of the Trigger2 frame. Therefore, the number of User Info included in the Trigger2 frame is restricted, and there is a case where the Trigger2 frame cannot be transmitted to the non-AP MLD3 as at time t2. In such a case, the desired number of users (terminals) cannot be multiplexed in the UL MU communication in link2.

Accordingly, at time t4, non-AP MLD1 to non-AP MLD3 transmit trigger-based (TB) PPDU to AP MLD1 in link1 on the basis of the Trigger1 frame. On the other hand, at time t4, only non-AP MLD1 and non-AP MLD2 transmit TB PPDU to AP MLD1 in link2 on the basis of the Trigger2 frame. As described above, PPDU is a MAC frame in a PHY protocol data unit (PPDU) format to which a PHY preamble, a PHY header, a packet extension (PE), and the like are added. Note that PPDU is a frame including at least one of data, management information, or control information.

Thereafter, non-AP MLD1 to non-AP MLD3 end the transmission of TB PPDU in link1 and link2 at time t5. At time t6, AP MLD1 transmits a Multi-STA BlockAck frame to non-AP MLD1 to non-AP MLD3 in link1, and transmits a Multi-STA BlockAck frame to non-AP MLD1 and non-AP MLD2 in link2. Note that the frame transmitted as acknowledgement of TB PPDU may be a BlockAck frame addressed to an individual address instead of the Multi-STA BlockAck frame.

That is, in a case of FIG. 2, since the number of User Info included in the Trigger2 frame is restricted and User Info of non-AP MLD3 is not included in the Trigger2 frame, non-AP MLD3 cannot transmit TB PPDU to the AP MLD1 via link2 at time t4.

As described above, in a case where the transmission start time of the Trigger frame is shifted between the links, the transmittable time of the Trigger frame to be transmitted later is restricted, and there is a possibility that it is difficult to perform multiplexing for the desired number of terminals.

3. First Embodiment

In the present technology, in communication over a plurality of links, information regarding transmission of at least a part of a frame to be transmitted in link2 is included in a Trigger frame of link1 and transmitted.

<Configuration of Device>

Figure 3:
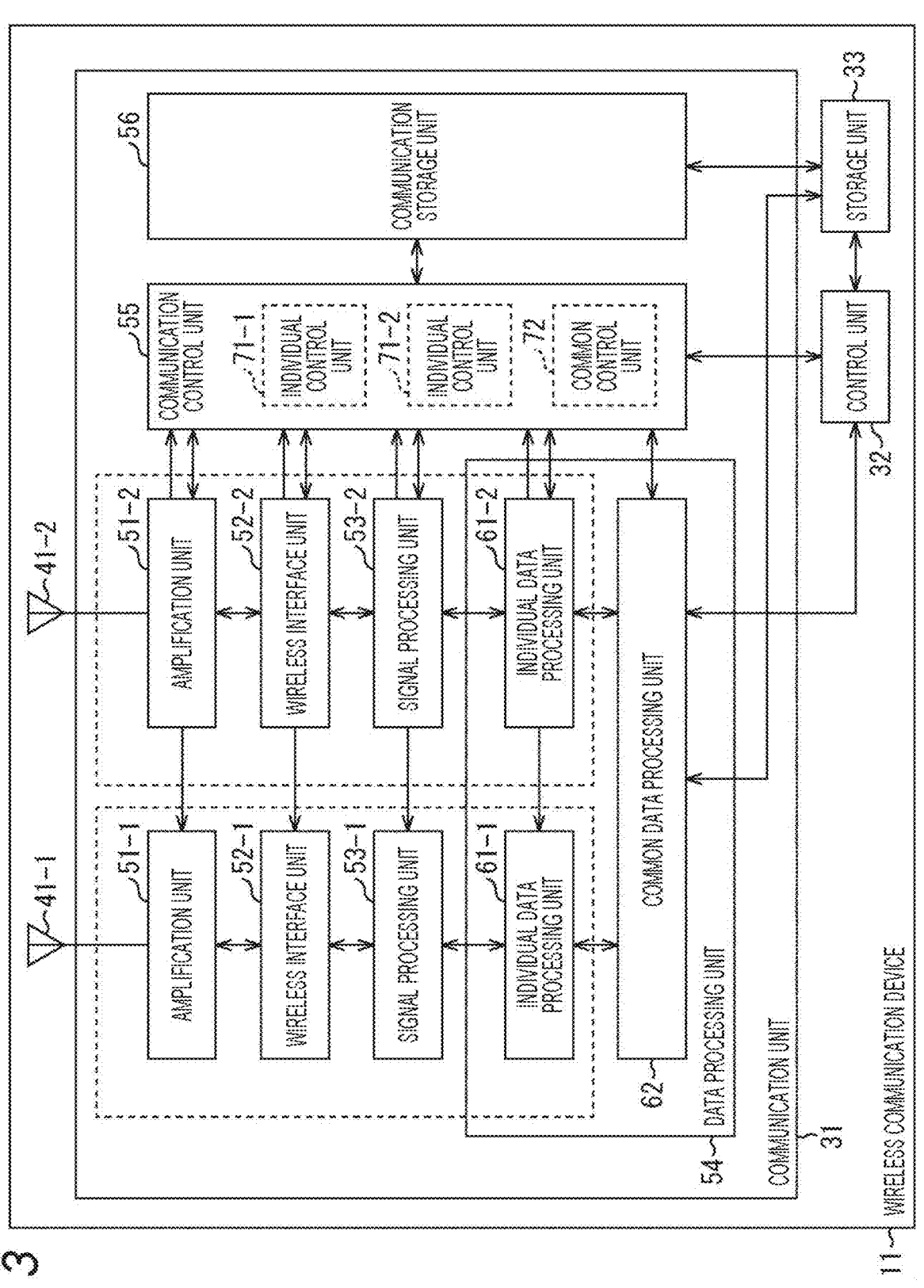
FIG. 3 is a block diagram illustrating a configuration example of a wireless communication device.

FIG. 3 is a block diagram illustrating a configuration example of a wireless communication device to which the present technology is applied.

A wireless communication device 11 illustrated in FIG. 3 is a wireless communication device that operates as AP MLD or non-AP MLD.

The wireless communication device 11 includes a communication unit 31, a control unit 32, a storage unit 33, and antennas 41-1 and 41-2. The antennas 41-1 and 41-2 are collectively referred to as an antenna 41 in a case where there is no need to distinguish them.

The communication unit 31 sends and receives data. The communication unit 31 includes amplification units 51-1 and 51-2, a wireless interface unit 52-1 and a wireless interface unit 52-2, and signal processing units 53-1 and 53-2. Furthermore, the communication unit 31 includes a data processing unit 54, a communication control unit 55, and a communication storage unit 56.

Note that the amplification units 51-1 and 51-2, the wireless interface units 52-1 and 52-2, and the signal processing units 53-1 and 53-2 are collectively referred to as an amplification unit 51, a wireless interface unit 52, and a signal processing unit 53, respectively, in a case where there is no need to distinguish them.

At the time of transmission, the amplification unit 51 amplifies an analog signal supplied from the wireless interface unit 52 to predetermined power, and outputs the analog signal with amplified power to the antenna 41. At the time of reception, the amplification unit 51 amplifies an analog signal supplied from the antenna 41 to predetermined power, and outputs the analog signal with amplified power to the wireless interface unit 52.

A part of the function of the amplification unit 51 may be included in the wireless interface unit 52. Furthermore, a part of the function of the amplification unit 51 may be a component outside the communication unit 31.

At the time of transmission, the wireless interface unit 52 converts a transmission symbol stream from the signal processing unit 53 into an analog signal, performs filtering, up-conversion to a carrier frequency, and phase control, and outputs the analog signal after the phase control to the amplification unit 51.

At the time of reception, the wireless interface unit 52 performs phase control, down-conversion, and reverse filtering on an analog signal supplied from the amplification unit 51, and outputs a reception symbol stream as a result of conversion into a digital signal to the signal processing unit 53.

At the time of transmission, the signal processing unit 53 performs coding, interleaving, modulation, and the like on a data unit supplied from the data processing unit 54, adds a physical header, and outputs a transmission symbol stream to each wireless interface unit 52.

At the time of reception, the signal processing unit 53 analyzes a physical header of a reception symbol stream supplied from each wireless interface unit 52, performs demodulation, deinterleaving, decoding, and the like on the reception symbol stream, and generates a data unit. The generated data unit is output to the data processing unit 54.

Note that the signal processing unit 53 performs complex channel characteristic estimation and spatial separation processing as necessary.

The data processing unit 54 includes individual data processing units 61-1 and 61-2 and a common data processing unit 62. In a case where it is not necessary to distinguish the individual data processing units 61-1 and 61-2, they are collectively referred to as an individual data processing unit 61.

At the time of transmission, the individual data processing unit 61 performs a channel access operation based on carrier sensing, addition of a MAC header and addition of an error detection code to data to be transmitted, and multiple coupling processing of data units.

At the time of reception, the individual data processing unit 61 performs decoupling processing of a MAC header of a received data unit, analysis and error detection, and a retransmission requesting operation.

At the time of transmission, the common data processing unit 62 performs sequence management of data held in the communication storage unit 56 and control information and management information received from the communication control unit 55. Furthermore, the common data processing unit 62 performs encryption processing of the control information and the management information or the like to generate a data unit, and allocates the generated data unit to the individual data processing units 61-1 and 61-2.

At the time of reception, the common data processing unit 62 performs analysis processing and reorder processing on a data unit.

The antenna 41, the amplification unit 51, the wireless interface unit 52, the signal processing unit 53, and the individual data processing unit 61 having the same branch number form one set (hereinafter also referred to as an individual communication set) as surrounded by a broken line. Note that, although not surrounded by the broken line, the individual communication set also includes an individual control unit 71 as described later.

In a case where the wireless communication device 11 is AP MLD, the individual communication set indicates AP. In a case where the wireless communication device 11 is non-AP MLD, the individual communication set indicates non-AP STA.

Each set becomes a component of the wireless communication device 11, and performs wireless communication on each link. Furthermore, the storage unit 33 may be included in each set.

Note that operations of the individual data processing unit 61 and the common data processing unit 62 are not limited to the operations described above, and for example, one may perform the operation of the other. For example, the individual data processing unit 61 may be defined such that all the functions of the common data processing unit 62 are implemented for every individual communication set.

Furthermore, the links used by the sets may have different frequency bands. Furthermore, the signal processing unit 53 and the individual data processing unit 61 having the same branch number may be one set, and two sets or three or more sets may be connected to one wireless interface unit 52.

The communication control unit 55 controls operation of each unit in the communication unit 31 and information transmission between the units. Furthermore, the communication control unit 55 performs control to transfer control information and management information notification of which is provided to another wireless communication device to the individual data processing unit 61 and the common data processing unit 62.

The communication control unit 55 includes individual control units 71-1 and 71-2 that control the individual communication sets, and a common control unit 72 that performs control common to the common data processing unit 62 and the individual communication sets. In a case where it is not necessary to distinguish the individual control units 71-1 and 71-2, they are collectively referred to as an individual control unit 71.

In the present technology, the individual control unit 71 transmits information regarding UL communication induced in each link to the other individual control unit 71, and controls each unit to include the information in a Trigger frame and transmit the information. At this time, the control information may be transmitted via the common control unit 72.

The communication storage unit 56 holds information to be used by the communication control unit 55. Furthermore, the communication storage unit 56 holds data to be sent and received data.

The control unit 32 includes a central processing unit (CPU), a read only memory (ROM), a random access memory (RAM), and the like. The control unit 32 executes a program stored in the ROM or the like, and controls the communication unit 31 and the communication control unit 55. Furthermore, the control unit 32 may also perform a part of the operation of the communication control unit 55. Furthermore, the communication control unit 55 and the control unit 32 may be configured as one block.

The storage unit 33 holds information used by the communication unit 31 and the control unit 32. Furthermore, the storage unit 33 may also perform a part of the operation of the communication storage unit 56. The storage unit 33 and the communication storage unit 56 may be configured as one block.

Note that the antenna 41, the amplification unit 51, and the wireless interface unit 52 having the same branch number form one set, and without being limited to two sets, three or more sets may be components of the wireless communication device 11. Furthermore, the communication unit 31 is realized by one or more LSIs.

The individual data processing unit 61 is also referred to as Lower MAC. The common data processing unit 62 is also referred to as Upper MAC or Higher MAC. Furthermore, a set of the individual data processing unit 61 and the common data processing unit 62 is also referred to as AP entity or non-AP entity. Furthermore, the communication control unit 55 is also referred to as multi-link device (MLD) management entity.

<Configuration Example of Trigger Plus Frame of Present Technology>

Figure 4:
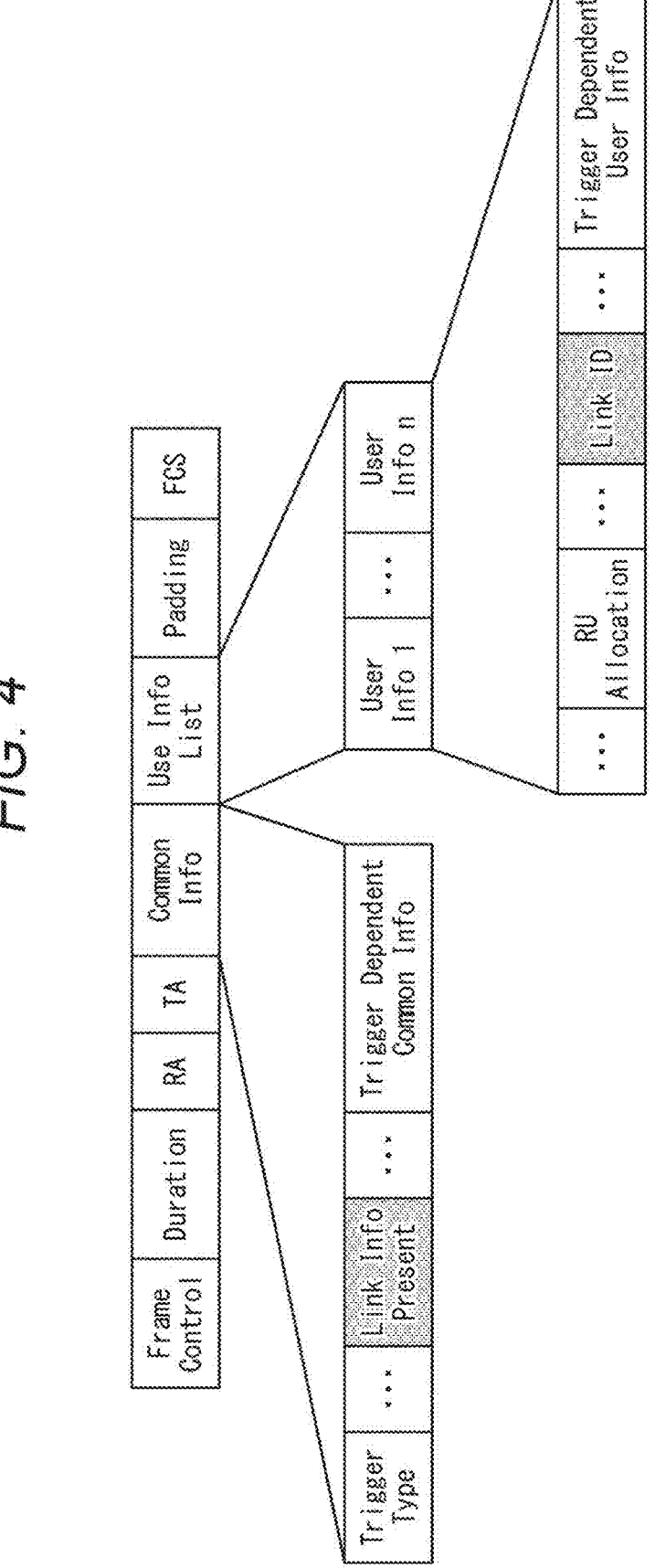
FIG. 4 is a diagram illustrating a configuration example of a Trigger Plus frame of the present technology.

FIG. 4 is a diagram illustrating a configuration example in a MAC layer of a Trigger Plus frame of the present technology.

In FIG. 4, the Trigger Plus frame includes fields of Frame Control, Duration, receiving STA address (RA), transmitting STA address (TA), Common Info, User Info List, Padding, and frame check sequence (FCS).

The Trigger Plus frame in FIG. 4 is a Trigger frame in which a conventional Trigger frame includes another link transmission information which is information regarding transmission of a frame of another link other than its own link. The other link transmission information is included for each User corresponding to the User Info List field.

The other link transmission information includes at least information such as a link ID, which is information for identifying the other link, and a channel or a resource unit (RU) in a band used in the other link, the number of transmission streams (SS), and a UL length (a length of a frame transmitted in the other link).

Moreover, the other link transmission information may include information such as transmission power, a modulation and coding scheme (MCS), and an association ID (AID).

The other link transmission information may include information such as FEC Coding Type (BCC or LDPC), information indicating whether or not to use dual carrier modulation (DCM), and an MAC protocol data unit (MPDU) multi user (MU) Spacing factor (information regarding a position of MDPU).

The other link transmission information may include information such as TID aggregation Limit (information regarding an aggregation upper limit of A-MDPU), Preferred AC (information regarding an access category to be transmitted), and Trigger Type (information regarding a Trigger frame and a type of TB PPDU that is a frame induced by the Trigger frame).

The other link transmission information may include information such as a guard interval (GI) and LTF type (information regarding GI of TB PPDU and a type of LTF), and a number of LTF symbols and midamble periodicity (information regarding the number of LTF symbols of TB PPDU and a cycle of a midamble).

The other link transmission information may include information such as a guard interval (GI) and LTF type (information regarding GI of TB PPDU and a type of LTF), and number of LTF symbles and midamble periodicity (information regarding the number of LTF symbols of TB PPDU and a cycle of a midamble).

The other link transmission information may include information such as UL STBC (information regarding an encoding method of TB PPDU), LDPC Extra Symbols segment (information regarding an LDPC code), and AP Tx Power (information regarding transmission power of AP).

The other link transmission information may include information such as Rre-FEC padding factor/PE disambiguity (information regarding lengths of Pre-FEC padding and PacketExtension field) and UL spatial reuse (information regarding spatial reuse).

The other link transmission information may include information such as Doppler (information regarding whether or not Midamble is included), UL SIG-A Reserved (information regarding information to be included in a reservation unit (Reserved) of the preamble), and information regarding a PPDU format of TB PPDU.

These pieces of other link transmission information are stored in corresponding fields of the Trigger Plus frame in FIG. 4.

FIG. 4 illustrates only main fields among the fields constituting the Trigger Plus frame.

Among the fields constituting the Trigger Plus frame, the field of Frame Control includes information indicating that this frame is a Trigger frame.

The field of Duration includes information indicating a communication period targeted by this frame.

The field of RA includes information indicating a destination device. For example, a device-specific MAC address may be indicated in RA.

The field of TA includes information indicating a transmission source device. For example, a device-specific MAC address may be indicated in TA.

The field of Common Info includes information common to all users.

Common Info includes at least subfields of Trigger Type, Link Info Present, and Trigger Dependent Common Info.

The subfield of Trigger Type includes the above-described Trigger Type information. Note that the subfield of Trigger Type may include information indicating that information regarding transmission of TB PPDU of another link is Trigger (Trigger Plus) of Type included in User Info as described later.

The subfield of Link Info Present includes information indicating that the information regarding the transmission of TB PPDU of the other link is included.

The field of Trigger Dependent Common Info includes common information regarding Trigger.

The field of User Info List includes a subfield of User Info including information on each user.

The user represents a terminal such as non-AP STA. The user includes not only a user of the link for transmitting this frame but also users of other links. That is, the other link transmission information is stored in the subfields of User Info for each User.

The subfields of User Info include at least subfields of RU Allocation, Link ID, and Trigger Dependent User Info.

The subfield of RU Allocation includes information on a channel and RU in a band used in a link of a corresponding user.

The subfield of Link ID includes link identification information of the corresponding user.

The subfield of Trigger Dependent User Info includes information of the corresponding user regarding Trigger.

A subfield of FCS includes an error detection code.

<Example of Sequence in First Embodiment>

Figure 5:
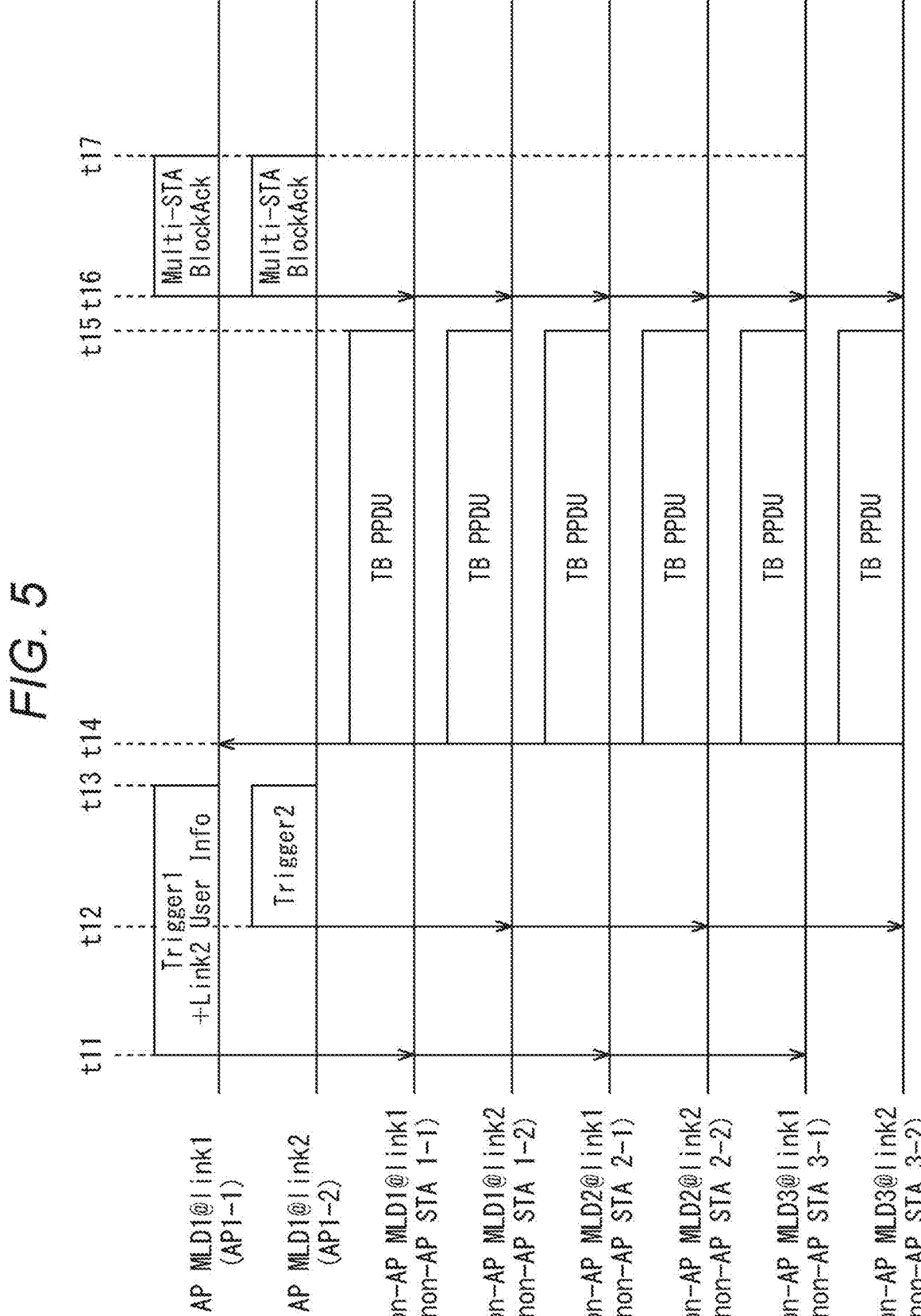
FIG. 5 is a diagram illustrating an example of a sequence in a first embodiment of the present technology.

FIG. 5 is a diagram illustrating an example of a sequence in the first embodiment of the present technology.

FIG. 5 illustrates a case where non-AP MLD1 to non-AP MLD3, which are non-STR non-AP MLDs, are connected to AP MLD1 in the wireless communication system of FIG. 1 and communicate with each other using link1 and link2 as in FIG. 2.

First, AP MLD1 acquires a transmission right in link1.

AP MLD1 calculates a difference between a scheduled acquisition time of a transmission right in link2 predicted from an access delay collected in advance and a scheduled transmission end time when a Trigger frame for inducing UL transmission of non-AP MLD1 to non-AP MLD3 is generated and transmitted in link1.

AP MLD1 determines that the Trigger frame including information for inducing all of non-AP MLD1 to non-AP MLD3 to perform an UL transmission cannot be transmitted within the scheduled trigger transmission end time. Then, AP MLD1 generates a Trigger Plus (Trigger1+link2 User Info) frame, which is, in addition to information regarding the UL transmission of non-AP MLD1 to non-AP MLD3 in link1, information regarding UL transmission of at least one of non-AP MLD1 to non-AP MLD3 in link2 is described in, for example, the User Info field. AP MLD1 transmits the Trigger Plus frame at time t11. In a case of FIG. 5, for example, an example in which a Trigger Plus frame in which information regarding UL transmission of non-AP MLD3 in link2 is described will be described.

AP MLD1 acquires a transmission right in link2, and transmits a Trigger (Trigger2) frame in which information such as a length of TB PPDU common to UL transmission of non-AP MLD1 to non-AP MLD3 is described in, for example, the Common Info field at time t12. Note that the User Info field of the Trigger2 frame includes information regarding UL transmission of non-AP MLD1 and non-AP MLD2.

AP MLD1 simultaneously terminates the transmission of the Trigger Plus frame and the Trigger2 frame at time t13. Non-AP MLD1 to non-AP MLD3 receive the Trigger Plus frame in link1 and receive the Trigger2 frame in link2.

At time t14, non-AP MLD1 to non-AP MLD3 transmit TB PPDU in link1 on the basis of the information described in the Trigger Plus frame. Furthermore, non-AP MLD1 and non-AP MLD2 transmit TB PPDU in link2 on the basis of the information described in the Trigger2 frame. Non-AP MLD3 transmits TB PPDU in link2 on the basis of the information described in the Trigger Plus frame and the Trigger2 frame.

Since the transmission of TB PPDU in link1 and link2 ends at time t15, AP MLD1 transmits a Multi-STA Block-Ack frame to non-AP MLD1 to non-AP MLD3 in link1 at time t16. Furthermore, AP MLD1 starts transmission of a Multi-STA BlockAck frame to non-AP MLD1 to non-AP MLD3 in link2. At time t17, the transmission of the Multi-STA BlockAck frames in link1 and link2 ends.

In response to the transmission of the Multi-STA Block-Ack frames by AP MLD1, non-AP MLD1 to non-AP MLD3 start reception of the Multi-STA BlockAck frames in link1 and link2 at time t16, and end the reception of the Multi-STA BlockAck frames in link1 and link2 at time t17.

<Processing of AP MLD>

Figure 6:
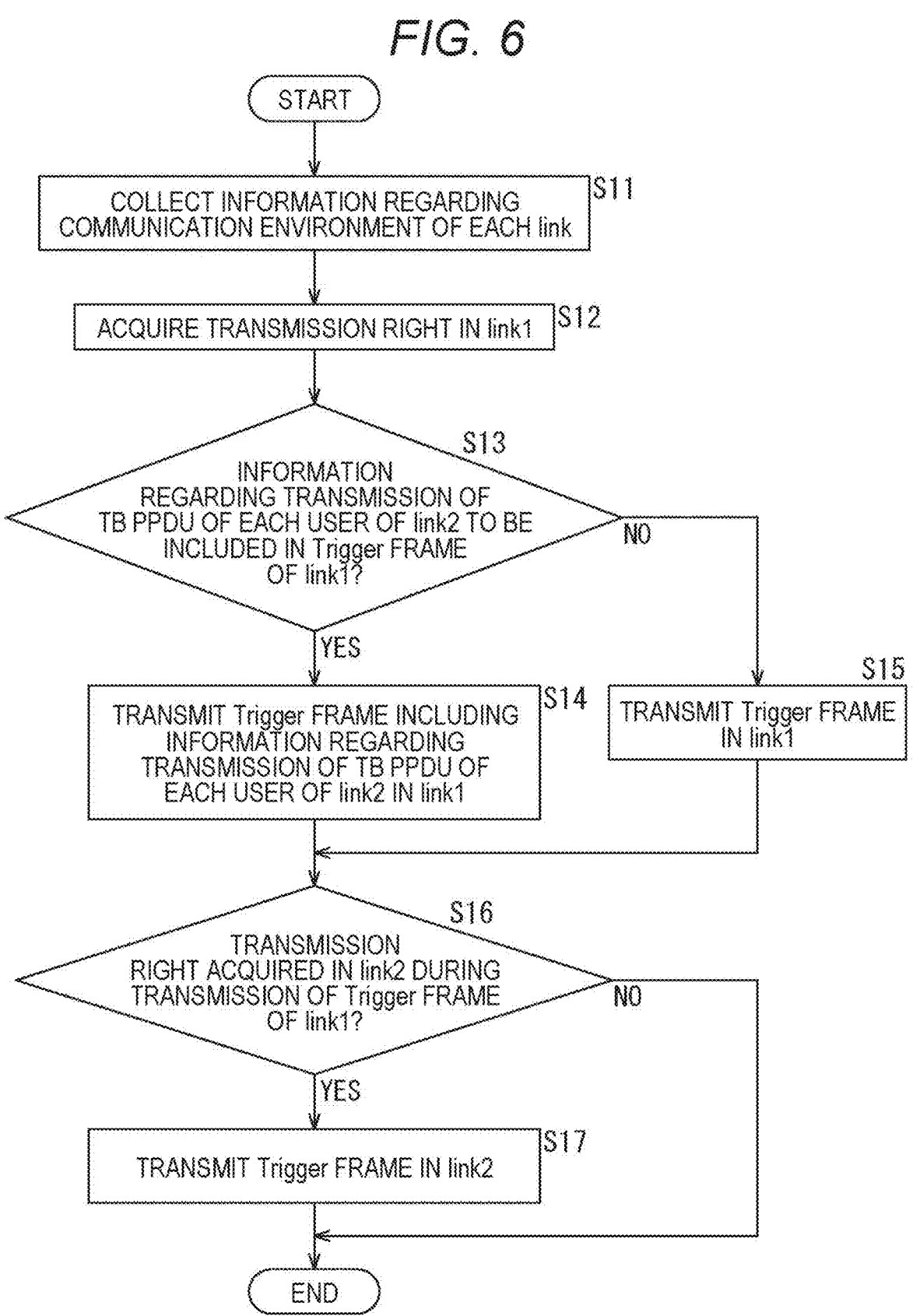
FIG. 6 is a flowchart describing processing of AP MLD.

FIG. 6 is a flowchart describing processing of AP MLD1.

In step S11, the communication control unit 55 of AP MLD1 collects information regarding a communication environment of each link.

The information regarding the communication environment of each link includes an average access delay (Average Access Delay) which is an average value of a time from the start of an attempt to acquire a transmission right to the actual start of signal transmission, information regarding traffic held by subordinate terminals, information regarding Capability of subordinate terminals, information regarding a random waiting time of AP of each link, and the like.

The information regarding the traffic held by the subordinate terminals includes, for example, Buffer Status Report.

The information regarding Capability of the subordinate terminals includes information indicating whether operating link pair is an STR link or an NSTR link, an amount of interference between links, and the like.

The information regarding the random waiting time of AP of each link includes an access category, a contention window, a remaining backoff counter, and the like.

In step S12, the communication control unit 55 of AP MLD1 acquires a transmission right in link1.

In step S13, the communication control unit 55 of AP MLD1 determines whether or not information regarding transmission of TB PPDU of each user of link2 is included in a Trigger frame of link1.

The determination in step S13 is performed using at least one of its own Capability information or the information collected in advance in step S11.

For example, the determination in step S13 is performed based on whether or not an acquisition time of a transmission right in link2 is greater than or equal to a first threshold value after transmission of the Trigger frame in link1. That is, in a case where the acquisition time of the transmission right in link2 is greater than or equal to the first threshold value, it is determined in step S13 that the information regarding the transmission of TB PPDU of each user of link2 is included in the Trigger frame of link1. The first threshold is, for example, a SlotTime (9 us)×3.

For example, the determination in step S13 is performed based on whether or not Average Access Delay of link2 is less than or equal to a second threshold value. That is, in a case where Average Access Delay of link2 is less than or equal to the second threshold value, it is determined in step S13 that the information regarding the transmission of TB PPDU of each user of link2 is included in the Trigger frame of link1. The second threshold is, for example, 144 us.

For example, the determination in step S13 is performed based on whether or not a remaining backoff counter of link2 is less than or equal to Average Access Delay of link2. That is, in a case where the remaining backoff counter of link2 is less than or equal to Average Access Delay of link2, it is determined in step S13 that the information regarding the transmission of TB PPDU of each user of link2 is included in the Trigger frame of link1.

In step S13, in a case where it is determined that the information regarding the transmission of TB PPDU of each user of link2 is included in the Trigger frame of link1, the processing proceeds to step S14.

Note that, at the time of the determination in step S13, it may be determined that information for how many users (terminals) among users induced by link2 is to be included in the Trigger frame of link1 and to be transmitted in link1. As illustrated in FIG. 5, the Trigger frame of link1 may include, for example, information for only non-AP MLD3 or information for all users.

In step S14, the communication control unit 55 of AP MLD1 transmits a Trigger frame including the information regarding the transmission of TB PPDU of each user of link2 in link1.

In a case where it is determined in step S13 that the information regarding the transmission of TB PPDU of each user of link2 is not included in the Trigger frame of link1, the processing proceeds to step S15.

In step S15, the communication control unit 55 of AP MLD1 transmits a Trigger frame that does not include the information regarding the transmission of TB PPDU of each user of link2 in link1.

After step S14 or S15, the processing proceeds to step S16.

In step S16, the communication control unit 55 of AP MLD1 determines whether or not the transmission right has been acquired in link2 during the transmission of the Trigger frame of link1. In a case where it is determined in step S16 that the transmission right has been acquired in link2 during the transmission of the Trigger frame of link1, the processing proceeds to step S17.

In step S17, the communication control unit 55 of AP MLD1 transmits the Trigger frame in link2.

At that time, information regarding a device including information in a Trigger Plus frame may also be described in the Trigger frame of link2, and in a case where the Trigger frame of link2 can be acquired, setting may be performed such that information by reception of the Trigger Plus frame is discarded.

Furthermore, a modulation and coding scheme (MCS: an Indexed combination of a modulation scheme, a coding rate, and the like) may be adjusted in order to secure the number of storage of information regarding the transmission of TB PPDU of users induced by the Trigger frame of link2 within the Trigger frame of link2.

After step S17, the processing ends.

Furthermore, in a case where it is determined in step S16 that the transmission right has not been acquired in link2 during the transmission of the Trigger Plus frame of link1, the processing also ends.

<Processing of Non-AP MLD>

Figure 7:
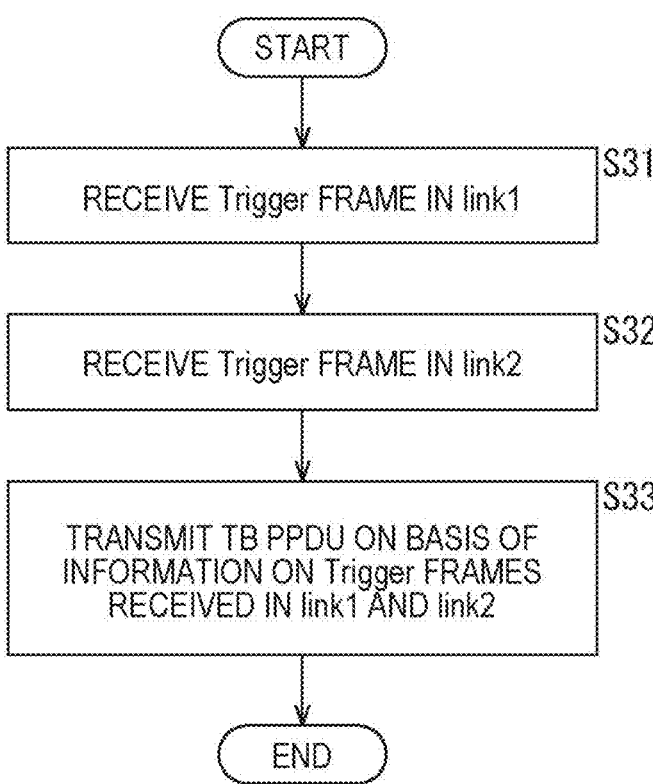
FIG. 7 is a flowchart describing processing of non AP MLD.

FIG. 7 is a flowchart describing processing of non-AP MLD.

In step S31, the communication control unit 55 of non-AP MLD receives a Trigger frame of link1 in link1.

In step S32, the communication control unit 55 of non-AP MLD receives a Trigger frame of link2 in link2.

Note that, at this time, in a case where the received Trigger frame of link1 includes information regarding transmission of TB PPDU of link2 related to non-AP MLD itself and the received Trigger frame of link2 also includes information regarding transmission of TB PPDU of link2 related to non-AP MLD itself, non-AP MLD may discard the information on the Trigger frame of link1 and retain only the information on the Trigger frame of link2.

In step S33, the communication control unit 55 of non-AP MLD transmits TB PPDU on the basis of information acquired from the Trigger frame of link1 and the Trigger frame of link2.

The information acquired from the Trigger frame of link1 and the Trigger frame of link2 is similar to the other link transmission information described above with reference to FIG. 4.

Note that, in a case where transmission resource (link, RU, band) information allocated to the Trigger frame of link1 is different from transmission resource information allocated to the Trigger frame of link2, the transmission of TB PPDU in step S33 may be canceled.

After step S33, the processing ends.

As described above, in the communication over the plurality of links, the information regarding transmission of at least a part of the frame in link2 is included in the Trigger frame of link1 and transmitted. This enables UL MU communication with the desired number of terminals.

4. Second Embodiment

In the first embodiment, there has been described a technique against a possibility that, in a case where the transmission start time of the Trigger frame is shifted between the links, the transmittable time of the Trigger frame to be transmitted later is restricted, and the multiplexing of the frames for the desired number of terminals becomes difficult.

The possibility that the multiplexing for the desired number of terminals becomes difficult in such a case also occurs when MLD corresponding to enhanced multi-link multi-radio (EMLMR) mode is induced.

EMLMR mode is a function of implementing an operation (EMLMR) of dynamically switching the number of RF chains to be used in each link and changing the maximum number of transmission/reception streams in each link by sharing an RF chain (an amplification unit or the like) in a plurality of links.

The switching operation of the RF chain has a certain period of time due to device mounting restrictions such as performance of switch for switching the RF chain and the like.

Therefore, even when MLD corresponding to EMLMR mode is induced by the Trigger frame, it may be difficult for MLD corresponding to EMLMR mode to secure a sufficient time for switching the RF chain due to the restriction of the transmission time of the Trigger frame described above with reference to FIG. 2. Therefore, there has been a possibility that MLD corresponding to EMLMR mode cannot transmit TB PPDU with the desired number of transmission streams after an SIFS time from reception of the Trigger frame.

The present technology can also be applied to MLD corresponding to such EMLMR mode.

<Configuration of Device>

Figure 8:
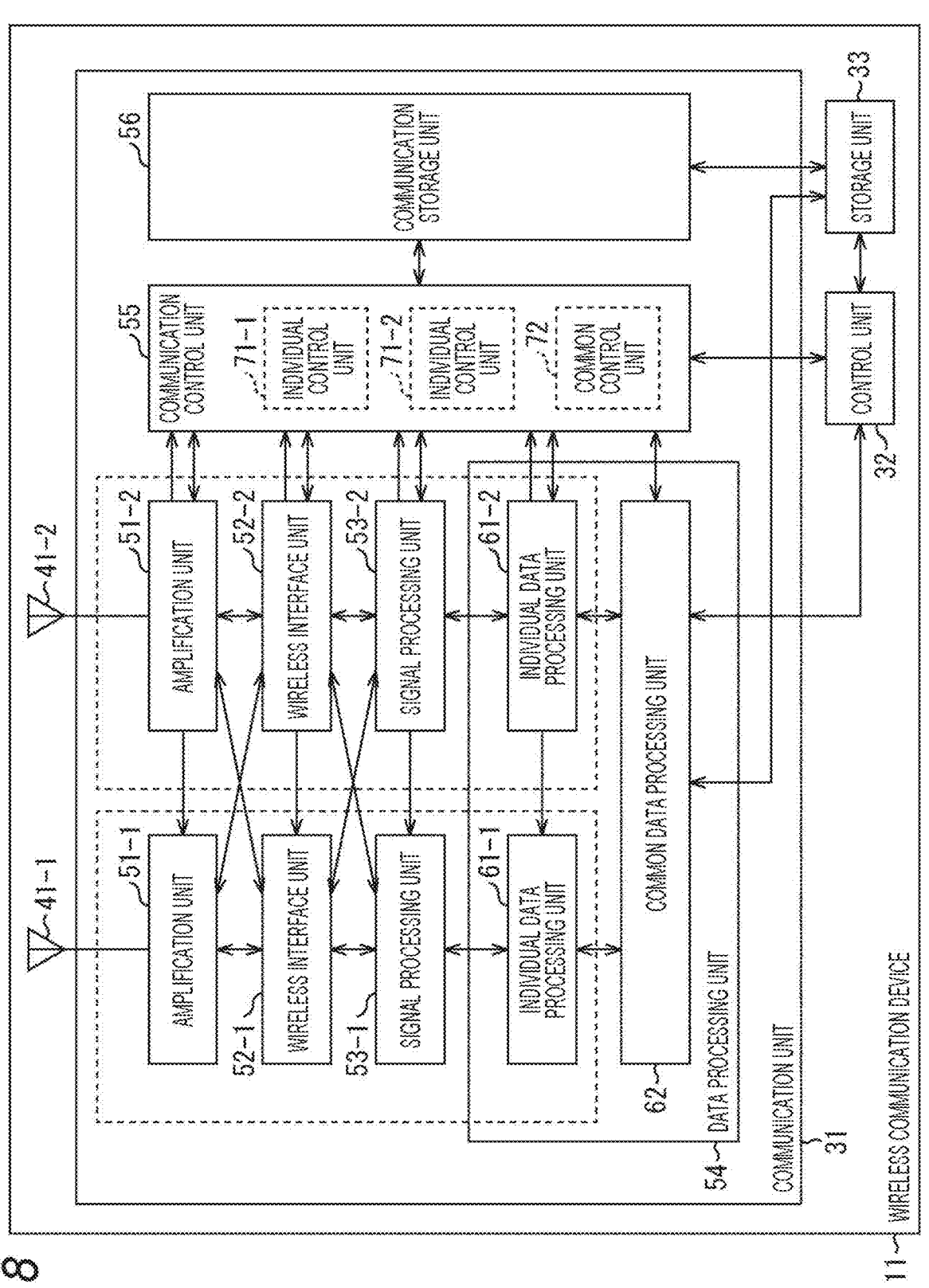
FIG. 8 is a block diagram illustrating a configuration example of a wireless communication device.

FIG. 8 is a block diagram illustrating another configuration example of the wireless communication device to which the present technology is applied.

The wireless communication device 11 illustrated in FIG. 8 is a wireless communication device that operates as AP MLD or non-AP MLD and corresponds to EMLMR mode.

The wireless communication device 11 of FIG. 8 is different only in that the wireless interface unit 52, the amplification unit 51, and the antenna 41, which are connected to the individual data processing unit 61 and the signal processing unit 53, can be dynamically switched to which link to use, and the other parts are common to those in the wireless communication device 11 of FIG. 3.

<Example of Sequence in Second Embodiment>

Figure 9:
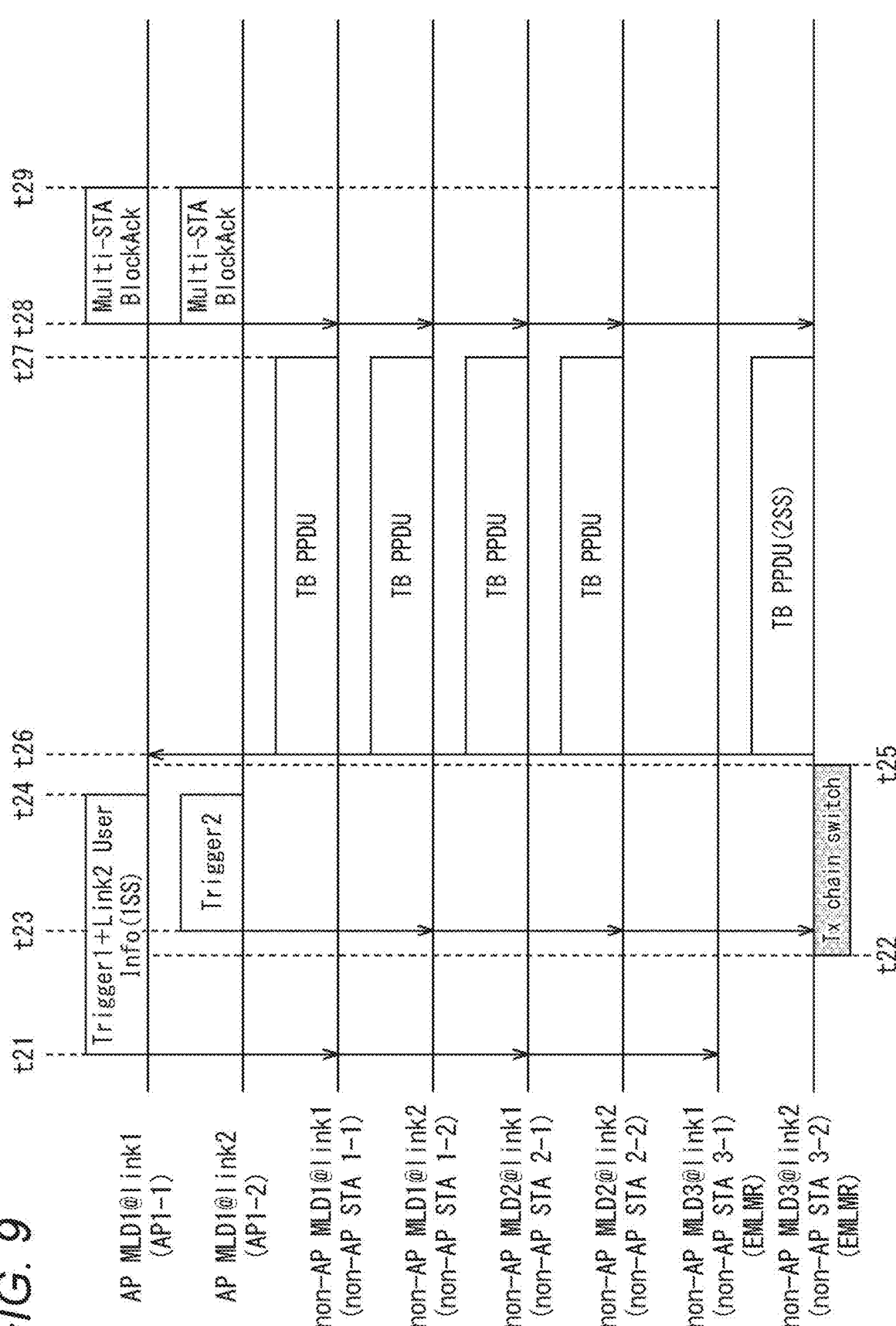
FIG. 9 is a diagram illustrating an example of a sequence in a second embodiment of the present technology.

FIG. 9 is a diagram illustrating an example of a sequence in the second embodiment of the present technology.

FIG. 9 illustrates a case where non-AP MLD1 to non-AP MLD3, which are non-STR non-AP MLDs, are connected to AP MLD1 in the wireless communication system of FIG. 1 and communicate with each other using link1 and link2 as in FIG. 5.

Figure 10:
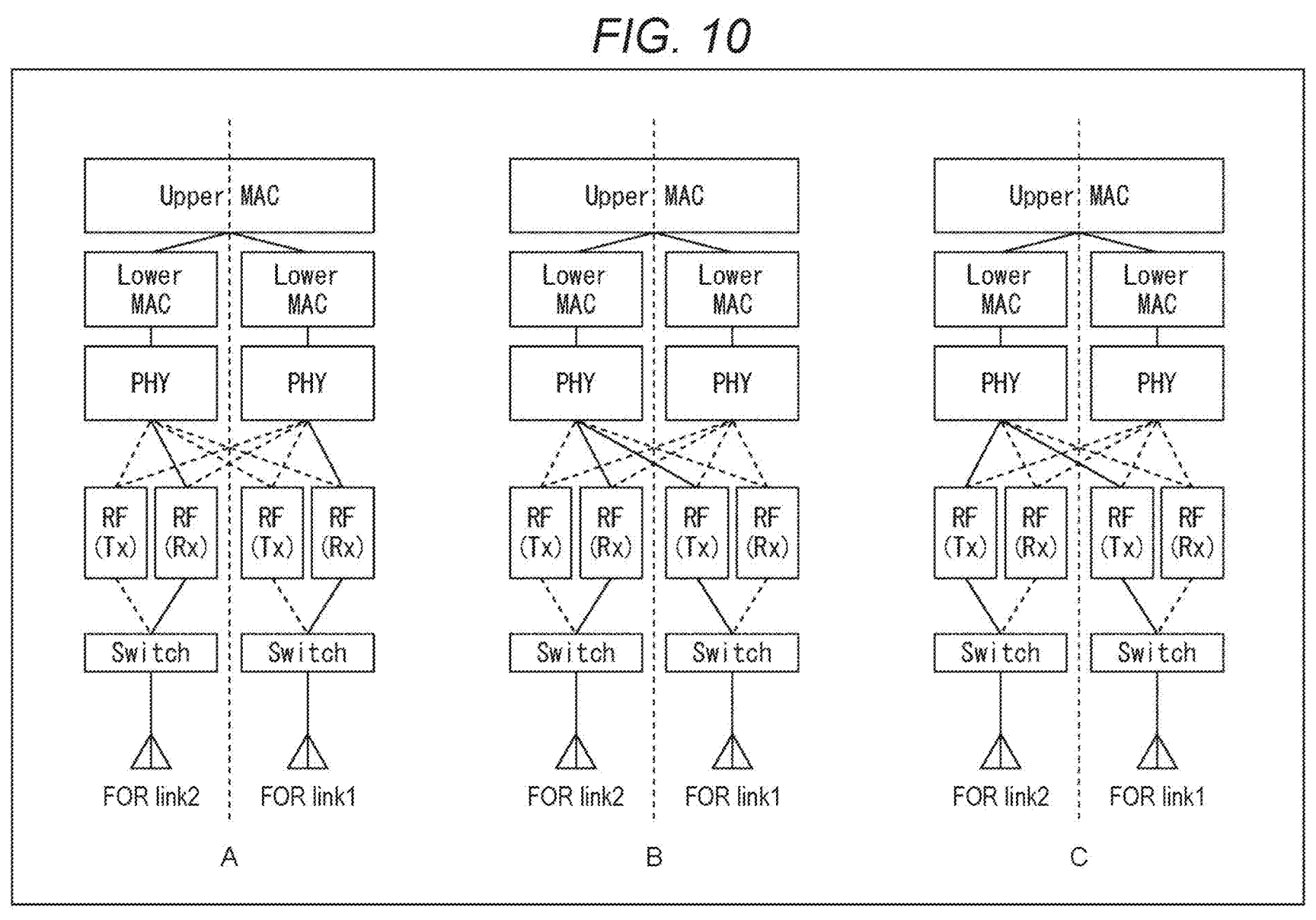

Moreover, in the case of FIG. 9, non-AP MLD3 corresponds to EMLMR mode as illustrated in FIG. 10.

FIG. 10 is a diagram illustrating an example of a switching operation of RF-Chain of non-AP MLD3 in FIG. 9.

FIG. 10 illustrates a part of the communication unit 31 of non-AP MLD3 which is the wireless communication device 11 corresponding to EMLMR mode.

As illustrated in FIG. 10, non-AP MLD3 is MLD having one Upper MAC, two Lower MACs, two PHY blocks, two RF chains (a combination of Tx chain and Rx-chain), two Switches, and two antennas. Note that a right side of the two functions for link1 and a left side functions for link2.

Upper MAC is the common data processing unit 62, Lower MAC is the individual data processing unit 61, and the PHY block is the signal processing unit 53 in FIG. 8. The antenna is the antenna 41. The RF chain corresponds to the amplification unit 51, and an interface portion between the PHY block and the RF chain serves as the wireless interface unit 52.

A of FIG. 10 illustrates an example of a state in which RF chains for link1 and link2 function as Rx chains for the links.

That is, in a case of A of FIG. 10, a signal of link1 received by the antenna for link1 is input to the PHY block for link1 via Switch for link1 and Rx chain for link1. A signal of link2 received by the antenna for link2 is input to the PHY block for link2 via Switch for link2 and Rx chain for link2.

B of FIG. 10 illustrates a state in which RF chain for link1 functions as Tx chain for link2, and RF chain for link2 functions as Rx-chain for link2.

That is, in a case of B of FIG. 10, a signal of link2 received by the antenna for link2 is input to the PHY block for link2 via Switch for link2 and Rx chain for link2, and the signal of link2 from the PHY block for link2 is output from the antenna for link1 via Tx chain for link1 and Switch for link1.

C of FIG. 10 illustrates a state in which RF chain for link1 functions as Tx chain for link2, and RF chain for link2 functions as Tx chain for link2.

That is, in a case of C of FIG. 10, a signal of link2 from the PHY block for link2 is output from the antenna for link1 via Tx chain for link1 and Switch for link1, and is output from the antenna for link2 via Tx chain for link2 and Switch for link2.

Hereinafter, the sequence of FIG. 9 will be described with reference to FIG. 10 as appropriate.

First, AP MLD1 acquires a transmission right in link1.

As described above with reference to FIG. 6, AP MLD1 collects information regarding a communication environment of each link before obtaining the transmission right. That is, non-AP MLD1 to non-AP MLD3 transmit the information regarding the communication environment of each link to AP MLD1.

At that time, in the second embodiment, information indicating whether or not to correspond to enhanced multi-link single-radio (EMLSR) or EMLMR mode and a chain switching delay time during EMLSR or EMLMR mode operation are acquired in addition to the case of FIG. 6 as information regarding Capability of subordinate terminals (non-AP MLD1 to non-AP MLD3) among the information regarding the communication environment of each link. Moreover, as the information regarding Capability of the subordinate terminals, information regarding the maximum number of transmission streams and the maximum number of reception streams in each link of EMLMR, and information regarding a time for operating in EMLSR mode or EMLMR mode are additionally acquired. Note that the information regarding Capability of the subordinate terminals may include information regarding corresponding transmission/reception parameters such as a bandwidth and MCS during EMLMR mode or EMLSR mode operation.

AP MLD1 determines the number of transmission streams of non-AP MLD3 corresponding to EMLMR mode on the basis of the acquired information regarding EMLMR.

Note that MLD corresponding to EMLSR mode normally operates in only one link. However, in MLD corresponding to EMLSR mode, only a reception function and a clear channel assessment (CCA) function of some control frames from AP are enabled in a plurality of links during a period of operating in EMLSR mode. Some control frames are, for example, MU-RTS Trigger frames or buffer status report poll (BSRP) Trigger frames.

In a case where MLD corresponding to EMLSR mode receives some control frames described above from AP during the period of operating in EMLSR mode, RF chain or the like can be switched so that transmission and reception can be performed on the received link. In the second embodiment, the second embodiment will be described using EMLMR mode as an example, but the second embodiment of the present technology may also be applied to EMLSR mode.

AP MLD1 calculates a difference between a scheduled acquisition time of a transmission right in link2 predicted from an access delay collected in advance and a scheduled transmission end time when a Trigger frame for inducing UL transmission of non-AP MLD1 to non-AP MLD3 is generated and transmitted in link1.

Furthermore, AP MLD1 determines whether or not a Trigger frame including information for inducing all of non-AP MLD1 to non-AP MLD3 to perform an UL transmission can be transmitted within the scheduled trigger transmission end time, whether or not a request for TB PPDU transmission in 2SS (SS: the number of transmission streams) is not necessary for non-AP MLD3, and moreover, whether or not a time for non-AP MLD3 to switch RF chain can be secured.

In a case where any one of these determinations is negative, AP MLD1 generates a Trigger Plus (Trigger1+ link2 User Info) frame, which is, in addition to information regarding the UL transmission of non-AP MLD1 to non-AP MLD3 in link1, information regarding UL transmission of at least one of non-AP MLD1 to non-AP MLD3 in link2 is described in the User Info field. AP MLD1 transmits the Trigger Plus frame at time t21.

Note that, at this point, AP MLD1 transmits the Trigger Plus frame in 1SS so that non-AP MLD3 can receive the Trigger Plus frame in link1.

Non-AP MLD3 receives the Trigger Plus frame in link1, and acquires information assigned to transmission in link2 and 2SS. At time t22, non-AP MLD3 starts an operation of switching Tx chain connected to the PHY block for link1 for transmission in link1 to connection to the PHY block for link2.

AP MLD1 acquires a transmission right in link2, and transmits, at time t23, a Trigger2 frame in which information such as a length of TB PPDU common to UL transmission of non-AP MLD1 to non-AP MLD3 is described in the Common Info field.

AP MLD1 simultaneously terminates the transmission of the Trigger Plus frame and the Trigger2 frame at time t24. Non-AP MLD1 to non-AP MLD3 receive the Trigger Plus frame in link1 and receive the Trigger2 frame in link2.

After completion of the reception of the Trigger Plus frame and the Trigger2 frame, Non-AP MLD3 switches RF chain connected to the antenna for link2 from Rx chain to Tx chain connected to the PHY block for link2 on the basis of the Trigger Plus frame. Therefore, non-AP MLD3 switches a state of Tx chain from a state in A of FIG. 10 to the state in B of FIG. 10.

Furthermore, non-AP MLD3 switches RF chain connected to the antenna for link1 from Rx chain to Tx chain connected to the PHY block for link1.

Therefore, at time t25, the switching operation is ended, the state of Tx chain is switched from the state in B of FIG. 10 to the state in C of FIG. 10 in which both Tx chains are connected to the PHY block for link2, and TB PPDU in 2SS can be transmitted in link2.

At time t26, non-AP MLD1 and non-AP MLD2 transmit TB PPDU in link1 on the basis of the information described in the Trigger Plus frame. Furthermore, non-AP MLD1 and non-AP MLD2 transmit TB PPDU in link2 on the basis of the information described in the Trigger2 frame. At this time, non-AP MLD3 transmits TB PPDU in link2 and 2SS on the basis of the information described in the Trigger Plus frame and the Trigger2 frame.

Since the transmission of TB PPDU in link1 and link2 ends at time t27, AP MLD1 transmits a Multi-STA Block-Ack frame to non-AP MLD1 and non-AP MLD2 in link1 and transmits a Multi-STA BlockAck frame to non-AP MLD1 to non-AP MLD3 in link2 at time t28. At time t29, the transmission of the Multi-STA BlockAck frames in link1 and link2 ends.

In response to the transmission of the Multi-STA Block-Ack frame by AP MLD1, non-AP MLD1 and non-AP MLD2 start reception of the Multi-STA BlockAck frame in link1 at time t28, and end the reception of the Multi-STA BlockAck frame in link1 at time t29.

In response to the transmission of the Multi-STA Block-Ack frame by AP MLD1, non-AP MLD1 and non-AP MLD3 start reception of the Multi-STA BlockAck frame in link2 at time t28, and end the reception of the Multi-STA BlockAck frame in link2 at time t29.

Note that processing of AP MLD in the second embodiment is similar to the processing of AP MLD described above with reference to FIG. 6 except that the following information is collected at the time of collecting the information in step S11 and determination is made on the basis of the following information in step S12, and thus, a detailed description thereof will be omitted.

That is, in the second embodiment, in step S11 of FIG. 6, in addition to the case of the first embodiment, information regarding EMLSR or EMLMR mode is collected as the information regarding Capability of the subordinate terminals.

Furthermore, in the second embodiment, the determination in step S12 in FIG. 6 is made on the basis of whether or not a terminal operating in EMLLR is present in non-AP MLD for which transmission in UL MU is desired to be induced, in addition to the case of the first embodiment.

On the other hand, processing of non-AP MLD in the second embodiment is MLD processing corresponding to EMLMR mode, and is similar to the processing of AP MLD described above with reference to FIG. 7 except that the following operation is performed at the time of receiving the Trigger Plus frame in step S31, and thus, a detailed description thereof will be omitted.

That is, in the second embodiment, in step S31 of FIG. 7, in addition to the case of the first embodiment, in a case where information regarding the transmission of the frame in link2 and 2SS is described in the Trigger Plus frame, Tx chains of both links are switched so as to be operable in link2. Furthermore, in a case where information regarding transmission of the frame in link1 and 2SS is described in the Trigger Plus frame, Tx chains of both links are switched so as to be operable in link1.

As described above, MLD corresponding to EMLMR mode is also transmitted by including the information regarding the transmission of at least a part of the frame in link2 in the Trigger frame of link1 in the communication over the plurality of links. Therefore, since the RF chain can be switched, UL MU communication with the desired number of terminals can be performed.

5. Others

<Effects of Present Technology>

As described above, in the present technology, in communication over the plurality of links, the information regarding transmission of at least a part of the frame in link2 is included in the Trigger frame of link1 and transmitted.

Therefore, even in restriction of transmission end time alignment at the time of frame transmission to non-STR non-AP MLD, UL ML transmission can be performed by multiplexing frames of sufficient number of terminals by the plurality of links. That is, it is possible to perform UL MU communication with the desired number of terminals.

Furthermore, in the present technology, a Trigger frame including information regarding UL transmission of an MLD frame of another link is also transmitted to MLD corresponding to EMLMR mode.

Therefore, the Trigger frame, which is a frame requesting a response in a SIFS period, can be induced in the other link to a terminal corresponding to EMLMR mode in which it takes time equal to or longer than SIFS to switch RF chain. Therefore, since the RF chain can be switched, UL MU communication with the desired number of terminals can be performed.

<Configuration Example of Computer>

The series of processing described above can be performed by hardware or can be performed by software. In a case where the series of processing is performed by software, a program constituting the software is installed from a program recording medium to a computer incorporated in dedicated hardware, a general-purpose personal computer, or the like.

Figure 11:
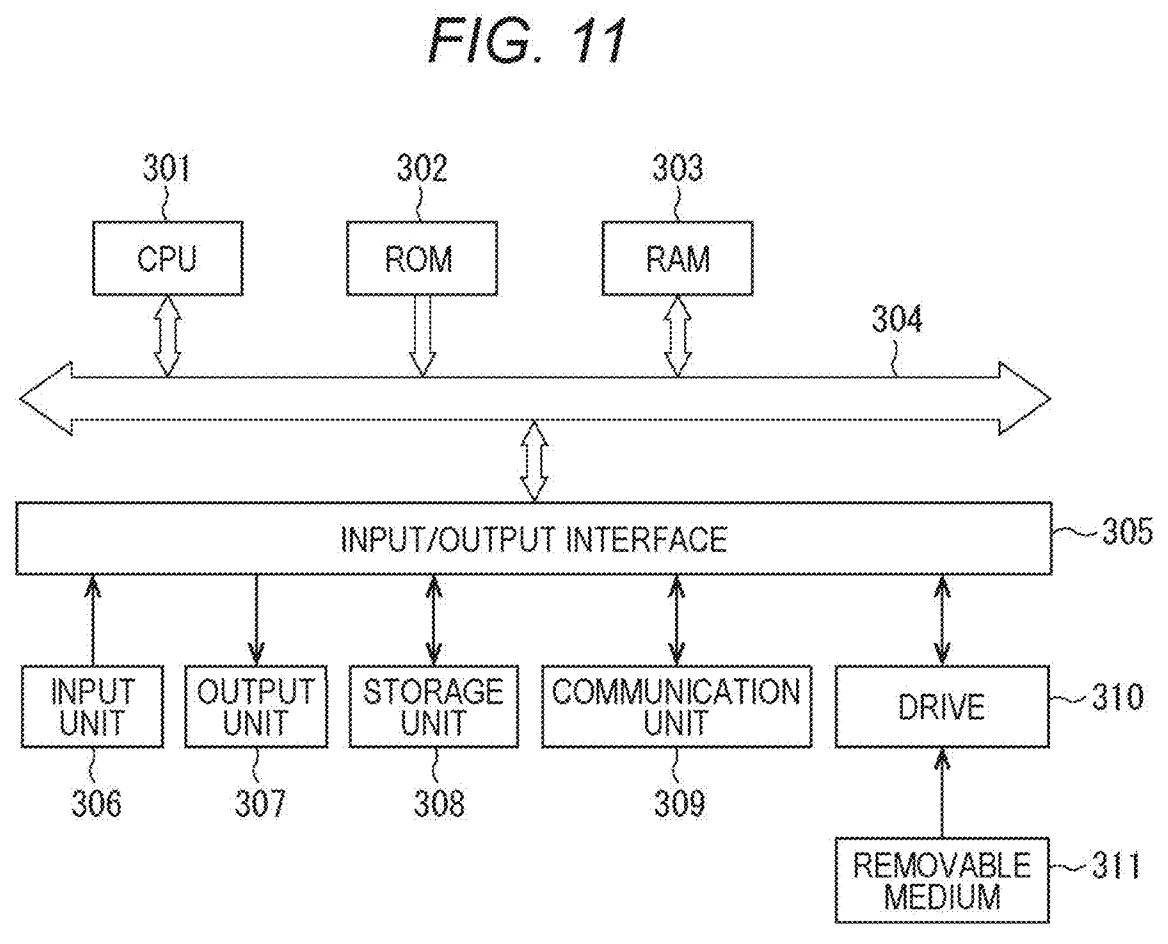

FIG. 11 is a block diagram illustrating a configuration example of hardware of a computer which executes the above-described series of processing by a program.

A central processing unit (CPU) 301, a read only memory (ROM) 302, and a random access memory (RAM) 303 are mutually connected by a bus 304.

Moreover, the bus 304 is connected to an input/output interface 305. The input/output interface 305 is connected to an input unit 306 including a keyboard, a mouse and the like, and an output unit 307 including a display, a speaker and the like. Furthermore, the input/output interface 305 is connected to a storage unit 308 including a hard disk, a non-volatile memory, and the like, a communication unit 309 including a network interface and the like, and a drive 310 that drives a removable medium 311.

In the computer configured as described above, for example, the CPU 301 loads a program stored in the storage unit 308 into the RAM 303 via the input/output interface 305 and the bus 304, and executes the program to perform the above-mentioned series of processing.

The program to be executed by the CPU 301 is provided, for example, by being recorded in the removable medium 311 or via a wired or wireless transmission medium such as a local area network, the Internet, or digital broadcasting, and is installed in the storage unit 308.

Note that the program executed by the computer may be a program for processing in time series in the order described in the present specification, or a program for processing in parallel or at a necessary timing such as when a call is made.

Note that in the present specification, a system means a set of a plurality of constituents (devices, modules (components), and the like), and it does not matter whether or not all the constituents are in the same housing. Therefore, a plurality of devices housed in separate housings and connected via a network and one device in which a plurality of modules is housed in one housing are both systems.

Furthermore, the effect described in the present specification is a merely example and is not limited, and there may also be other effects.

The embodiments of the present technology are not limited to the above-described embodiments and various modifications may be made without departing from the gist of the present technology.

For example, the present technology can be configured as cloud computing in which one function is shared by a plurality of devices through a network for processing in cooperation.

Furthermore, each step described in the above-described flowchart can be executed by one device or executed by a plurality of devices in a shared manner.

Moreover, in a case where a plurality of processing is included in one step, the plurality of processing included in one step can be executed by one device or by a plurality of devices in a shared manner.

<Combination Examples of Configurations>

The present technology can also have the following configurations.

(1)

A wireless communication device including:

a communication unit that communicates with a wireless communication terminal over a plurality of links; and a communication control unit that causes a first Trigger frame to be transmitted in a first link, the first Trigger frame including first information regarding transmission of a frame in the first link and second information regarding transmission of at least a part of a frame in a second link.

(2)

The wireless communication device according to (1), in which the second information is information regarding transmission by at least one of the wireless communication terminals of the frame in the second link.

(3)

The wireless communication device according to (1) or (2), in which the second information includes at least one of identification information for identifying the second link, transmission resource information, information regarding a length for transmitting a frame, or information regarding a transmission stream.

(4)

The wireless communication device according to (3), in which the communication unit receives information regarding enhanced multi-link multi-radio (EMLMR) transmitted from the wireless communication terminal, and in a case where the second information includes the information regarding the transmission stream, the communication control unit determines the number of transmission streams on the basis of the information regarding EMLMR.

(5)

The wireless communication device according to any one of (1) to (4), in which the communication control unit determines whether or not the second information is included in the first Trigger frame before transmitting the first Trigger frame.

(6)

The wireless communication device according to (5), in which the communication control unit determines whether or not the second information is included in the first Trigger frame on the basis of information regarding a communication environment of each link.

(7)

The wireless communication device according to (6), in which the information regarding the communication environment of each link is a difference between random waiting times of the first link and the second link.

(8)

The wireless communication device according to (6), in which the information regarding the communication environment of each link is an average access delay of the second link.

(9)

The wireless communication device according to any one of (1) to (8), in which the communication control unit causes a second Trigger frame to be transmitted in the second link, the second Trigger frame including third information regarding transmission of a frame in the second link so that an end time of the second Trigger frame is aligned with an end time of the first Trigger frame.

(10)

A wireless communication method including:

by a wireless communication device, performing communication with a wireless communication terminal over a plurality of links; and causing a first Trigger frame to be transmitted in a first link, the first Trigger frame including first information regarding transmission of a frame in the first link and second information regarding transmission of a frame in a second link.

(11)

A wireless communication terminal including:

a communication unit that performs communication with a wireless communication device over a plurality of links, and receives a first Trigger frame including first information regarding transmission of a frame in a first link and second information regarding transmission of at least a part of a frame in a second link and a second Trigger frame including third information regarding transmission of a frame in the second link; and a communication control unit that causes a frame to be transmitted in the second link on the basis of the second information and the third information.

(12)

The wireless communication terminal according to (11), in which the second information is information regarding transmission by at least one of the wireless communication terminals of the frame in the second link.

(13)

The wireless communication terminal according to (11) or (12), in which the second information includes at least one of identification information for identifying the second link, transmission resource information, information regarding a length for transmitting a frame, or information regarding a transmission stream.

(14)

The wireless communication terminal according to (13), in which the communication unit transmits information regarding enhanced multi-link multi-radio (EMLMR) to the wireless communication device.

(15)

The wireless communication terminal according to (13), in which the communication control unit changes the number of transmission streams to be used in the first link and the second link on the basis of the information regarding the transmission stream determined by the wireless communication device that has received the information regarding enhanced multi-link multi-radio (EMLMR), and causes at least one of the first link or the second link to transmit a frame with the changed number of transmission streams.

(16)

A wireless communication method including:

by a wireless communication terminal, performing communication with a wireless communication device over a plurality of links, and receiving a first Trigger frame including first information regarding transmission of a frame in a first link and second information regarding transmission of at least a part of a frame in a second link and a second Trigger frame including third information regarding transmission of a frame in the second link; and causing a frame to be transmitted in the second link on the basis of the second information and the third information.

REFERENCE SIGNS LIST

11 Wireless communication device
31 Communication unit
41, 41-1, 41-2 Antenna
54 Data processing unit
51, 51-1, 51-2 Amplification unit
52, 52-1, 52-2 Wireless interface unit
53, 53-1, 53-2 Signal processing unit
55 Communication control unit
56 Communication storage unit
61, 61-1, 61-2 Individual data processing unit
62 Common data processing unit
71, 71-1, 71-2 Individual control unit
72 Common control unit

The invention claimed is:

1. A wireless communication device comprising:
control circuitry configured to control communication with a plurality of other wireless communication devices over a plurality of links including a first link and one or more second links,
wherein the communication includes:
prior to transmitting a first downlink frame to the plurality of other wireless communication devices in the first link, the first downlink frame to include first information regarding transmission of first uplink frames by the plurality of other wireless communication devices in the first link, determining, on a basis of environment information regarding a communication environment of the first link and at least one of the second links, whether an entirety of second information is to be included in the first downlink frame or only a first portion, less than the entirety, of the second information is to be included in the first downlink frame, the second information being information regarding transmission of second uplink frames by at least one of the plurality of other wireless communication devices in at least one of the second links; and
transmitting the first downlink frame to the plurality of other wireless communication devices in the first link,
wherein, based on the determining, the transmitted first downlink frame includes:
the first information, and
one of:
the entirety of the second information, or
only the first portion of the second information, and
wherein the environment information is at least one of:
a difference between random waiting times of the first link and at least one of the second links, or
an average access delay of at least one of the second links.

2. The wireless communication device according to claim 1, wherein the second information includes at least one of:
identification information for identifying the at least one of the second links,
transmission resource information for the at least one of the second links,
information regarding a frame transmission length of the at least one of the second links, or
information regarding a transmission stream for the at least one of the second links.

3. The wireless communication device according to claim 2,
wherein the control circuitry is configured to control, prior to performing the communication, receive enhanced multi-link multi-radio (EMLMR) information transmitted from at least one of the plurality of other wireless communication devices, and
wherein the control circuitry is configured to determine, in a case where the second information includes the information regarding the transmission stream, a number of transmission streams to be used for to be used for at least one of the second links on a basis of the EMLMR information.

4. The wireless communication device according to claim 1,
wherein, when the control circuitry determines that only the first portion of the second information is to be included in the first downlink frame, the communication further includes transmitting a second downlink frame in at least one of the second links, the second downlink frame including a remaining portion of the second information regarding the transmission of the second uplink frames in at least one of the second links,
wherein a start time of the second downlink frame follows a start time of the first downlink frame, and
wherein an end time of the second downlink frame is aligned with an end time of the first downlink frame.

5. The wireless communication device according to claim 4, wherein the communication includes:
receiving a first trigger-based physical layer protocol data unit (TB PPDU) on the first link in response to the first information, receiving a second TB PPDU on at least one of the second links in response to the first portion and the remaining portion of the second information, and simultaneously transmitting a block acknowledgment to the first and second TB PPDUs on the first link and at least one of the second links.

6. The wireless communication device according to claim 1, wherein, based on the first downlink frame including the entirety of the second information, the communication includes:

receiving a first trigger-based physical layer protocol data unit (TB PPDU) on the first link in response to the first downlink frame, receiving a second TB PPDU on at least one of the second links in response to the first downlink frame, and simultaneously transmitting a block acknowledgment to the first and second TB PPDUs on the first link and at least one of the second links.

7. A wireless communication method performed by control circuitry of a wireless communication device, the wireless communication method comprising:

controlling communication with a plurality of other wireless communication devices over a plurality of links including a first link and one or more second links, wherein the communication includes:

prior to transmitting a first downlink frame to the plurality of other wireless communication devices in the first link, the first downlink frame to include first information regarding transmission of first uplink frames by the plurality of other wireless communication devices in the first link, determining, on a basis of environment information regarding a communication environment of the first link and at least one of the second links, whether an entirety of second information is to be included in the first downlink frame or only a first portion, less than the entirety, of the second information is to be included in the first downlink frame, the second information being information regarding transmission of second uplink frames by at least one of the plurality of other wireless communication devices in at least one of the second links; and transmitting the first downlink frame to the plurality of other wireless communication devices in the first link, wherein, based on the determining, the transmitted first downlink frame includes:

the first information, and one of:

the entirety of the second information, or only the first portion of the second information, and wherein the environment information is at least one of:

a difference between random waiting times of the first link and at least one of the second links, or an average access delay of at least one of the second links.

8. The wireless communication method according to claim 7, wherein, when the control circuitry determines that only the first portion of the second information is to be included in the first downlink frame, the communication includes transmitting a second downlink frame in at least one of the second links, the second downlink frame including a remaining portion of the second information regarding the transmission of the second uplink frames in at least one of the second links, wherein a start time of the second downlink frame follows a start time of the first downlink frame, and wherein an end time of the second downlink frame is aligned with an end time of the first downlink frame.

9. The wireless communication method according to claim 8, wherein the communication includes:

receiving a first trigger-based physical layer protocol data unit (TB PPDU) on the first link in response to the first information, receiving a second TB PPDU on at least one of the second links in response to the first portion and the remaining portion of the second information, and simultaneously transmitting a block acknowledgment to the first and second TB PPDUs on the first link and at least one of the second links.

10. The wireless communication method according to claim 7, wherein, based on the first downlink frame including the entirety of the second information, the communication includes:

receiving a first trigger-based physical layer protocol data unit (TB PPDU) on the first link in response to the first information, receiving a second TB PPDU on at least one of the second links in response to the second information, and simultaneously transmitting a block acknowledgment to the first and second TB PPDUs on the first link and at least one of the second links.

11. A wireless communication terminal comprising:

control circuitry configured to control communication with a wireless communication device over a plurality of links including a first link and one or more second links, wherein the communication includes:

receiving a first downlink frame from the wireless communication device in the first link, the first downlink frame to include first information regarding transmission of a first uplink frame by the wireless communication terminal to the wireless communication device in the first link;

determining whether an entirety of second information is included in the first downlink frame or only a first portion, less than the entirety, of the second information is included in the first downlink frame, the second information being information regarding transmission of a second uplink frame by the wireless communication terminal to the wireless communication device in at least one of the second links;

receiving the second downlink frame on at least one of the second links; and based on determining that the entirety of the second information is included in the first downlink frame, transmitting the second uplink frame to the wireless communication device in at least one of the second links only based on the first downlink frame without relying on the second downlink frame, or based on determining that only the first portion of the second information is included in the first downlink frame, transmitting the second uplink frame to the wireless communication device in at least one of the second links based on the first downlink frame and the second downlink frame.

12. The wireless communication terminal according to claim 11, wherein the second information includes at least one of:

identification information for identifying the at least one of the second links, transmission resource information, information regarding a frame transmission length, or information regarding a transmission stream.

13. The wireless communication terminal according to claim 12, wherein the control circuitry is configured to transmit, prior to performing the communication, enhanced multi-link multi-radio (EMLMR) information to the wireless communication device.

14. The wireless communication terminal according to claim 12, wherein the control circuitry is configured to change a number of transmission streams to be used in the first link and the at least one of the second links on a basis of the information regarding the transmission stream, the information regarding the transmission stream having been determined by the wireless communication device based on the transmitted EMLMR information, and wherein the communication includes causing at least one of the first link or the at least one of the second links to transmit another frame with the changed number of transmission streams.

15. The wireless communication terminal according to claim 11, wherein a start time of the second downlink frame follows a start time of the first downlink frame, and wherein an end time of the second downlink frame is aligned with an end time of the first downlink frame.

16. The wireless communication terminal according to claim 15, wherein the first uplink frame is a first trigger-based physical layer protocol data unit (TB PPDU), wherein the second uplink frame is a second TB PPDU, and wherein the communication includes simultaneously receiving a block acknowledgment to the first and second TB PPDUs on the first link and at least one of the second links.

17. A wireless communication method performed by control circuitry of a wireless communication terminal, the wireless communication method comprising:

controlling communication with a wireless communication device over a plurality of links including a first link and one or more second links, wherein the communication includes:

receiving a first downlink frame from the wireless communication device in the first link, the first downlink frame to include first information regarding transmission of a first uplink frame by the wireless communication terminal to the wireless communication device in the first link;

determining whether an entirety of second information is included in the first downlink frame or only a first portion, less than the entirety, of the second information is included in the first downlink frame, the second information being information regarding transmission of a second uplink frame by the wireless communication terminal to the wireless communication device in at least one of the second links;

receiving the second downlink frame on at least one of the second links; and based on determining that the entirety of the second information is included in the first downlink frame, transmitting the second uplink frame to the wireless communication device in at least one of the second links only based on the first downlink frame without relying on the second downlink frame, or based on determining that only the first portion of the second information is included in the first downlink frame, transmitting the second uplink frame to the wireless communication device in at least one of the second links based on the first downlink frame and the second downlink frame.

18. The wireless communication method according to claim 17, wherein a start time of the second downlink frame follows a start time of the first downlink frame, and wherein an end time of the second downlink frame is aligned with an end time of the first downlink frame.

19. The wireless communication method according to claim 18, wherein the first uplink frame is a first trigger-based physical layer protocol data unit (TB PPDU), wherein the second uplink frame is a second TB PPDU, and wherein the communication includes simultaneously receiving a block acknowledgment to the first and second TB PPDUs on the first link and at least one of the second links.

* * * * *